(12) United States Patent
Knoepfle et al.

(10) Patent No.: US 11,485,205 B2
(45) Date of Patent: Nov. 1, 2022

(54) VEHICLE ROOF HAVING A ROOF OPENING SYSTEM AND DRIVE DEVICE FOR KINEMATIC UNITS

(71) Applicant: Webasto SE, Stockdorf (DE)

(72) Inventors: Julian Knoepfle, Stockdorf (DE); Engelbert Hirschvogel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/277,751

(22) PCT Filed: Sep. 30, 2019

(86) PCT No.: PCT/EP2019/076424
§ 371 (c)(1),
(2) Date: Mar. 19, 2021

(87) PCT Pub. No.: WO2020/070056
PCT Pub. Date: Apr. 9, 2020

(65) Prior Publication Data
US 2021/0370749 A1 Dec. 2, 2021

(30) Foreign Application Priority Data

Oct. 2, 2018 (DE) ..................... 10 2018 124 382.0

(51) Int. Cl.
*B60J 7/043* (2006.01)
*B60J 7/057* (2006.01)

(52) U.S. Cl.
CPC ........... *B60J 7/0573* (2013.01); *B60J 7/0435* (2013.01)

(58) Field of Classification Search
CPC ......... B60J 7/0435; B60J 7/057; B60J 7/0573
(Continued)

(56) References Cited

U.S. PATENT DOCUMENTS 4,893,869 A 1/1990 Fuerst
5,310,241 A 5/1994 Omoto et al.
(Continued)

FOREIGN PATENT DOCUMENTS

DE 3523882 A1 1/1987
DE 3532111 A1 3/1987
(Continued)

OTHER PUBLICATIONS

International Preliminary Report on Patentability for PCT/EP2019/076424 dated Mar. 23, 2021 in English (7 pages).
(Continued)

*Primary Examiner* — Dennis H Pedder
(74) *Attorney, Agent, or Firm* — Fitch, Even, Tabin & Flannery, LLP (57) ABSTRACT

A vehicle having a roof opening system having a lid element displaceable between a closed and opened position, displacement kinematics for displacing the lid element which are disposed on either side of a vertical longitudinal roof plane, each of the displacement kinematics having a guide rail, a front kinematic unit guided in the guide rail and a rear kinematic unit disposed in the guide rail, and a set of drive cables for the two kinematic units. The guide rail may have a first cable duct section for a first drive cable of the set of drive cables, the first drive cable being driven by a first drive motor and driving the front kinematic unit, and a second cable duct section for a second drive cable of the set of drive cables, the second drive cable being driven by a second drive motor and driving the rear kinematic unit.

3 Claims, 9 Drawing Sheets (58) Field of Classification Search
USPC .......... 296/216.02–216.5, 221–223, 216.08
See application file for complete search history.

(56) References Cited

U.S. PATENT DOCUMENTS

| | | | | |
|---|---|---|---|---|
| 5,775,769 | A * | 7/1998 | Reihl | ............ B60J 7/05 296/216.03 |
| 9,227,493 | B2 * | 1/2016 | Nellen | ............ B60J 7/0435 |
| 2011/0049940 | A1 | 3/2011 | Hoelzel | |

FOREIGN PATENT DOCUMENTS

| | | | |
|---|---|---|---|
| DE | 3735686 C1 | 12/1988 | |
| DE | 19634324 C2 * | 12/1998 | ............ B60J 7/0435 |
| DE | 10219395 * | 2/2017 | |
| EP | 3106331 A1 | 12/2016 | |
| WO | 2009-135450 A1 | 11/2009 | |

OTHER PUBLICATIONS

International Search Report for PCT/EP2019/076424 dated Jan. 21, 2020 in English and German (5 pages).

* cited by examiner

VEHICLE ROOF HAVING A ROOF OPENING SYSTEM AND DRIVE DEVICE FOR KINEMATIC UNITS

CROSS-REFERENCE TO RELATED APPLICATIONS

This application is a U.S. national phase application filed under 35 U.S.C. § 371 of International Application No. PCT/EP2019/076424, filed 30 Sep. 2019, designating the United States, which claims priority from German Patent Application No. 10 2018 124 382.0, filed 2 Oct. 2018, which are hereby incorporated herein by reference in their entirety for all purposes.

FIELD

The invention relates to a vehicle roof having a roof opening system, the vehicle roof comprising the features of the preamble of claim 1.

BACKGROUND

A vehicle roof of this kind is known from practice and is in particular what is known as a spoiler roof, which comprises a roof opening system in which a lid element moveable in the longitudinal roof direction can be tilted upward at its rear edge relative to a solid roof portion starting from a closed position, in which a roof opening is closed, and be moved across the solid roof portion in the direction of the rear so as to open the roof opening. The lid element is coupled to displacement kinematics on either side of a vertical longitudinal center roof plane, whereby it is displaceable between the closed position and the open position. The displacement kinematics each comprise a front kinematic unit moveable in a guide rail and a rear kinematic unit also guided in the guide rail. When the lid element is being displaced into the open position, a tilting lever of the rear kinematic unit is pivoted, causing the rear edge of the lid element to be lifted. Then the front kinematic unit is moved rearward in the guide rail, a guide track formed on the lid element being moved to the tilting lever of the stationary rear kinematic unit, the tilting lever being provided with a guide member. The front kinematic unit and the rear kinematic unit are connected via a coupling rod for tilting the tilting lever. Once the tilting lever has been tilted, the coupling rod is detached from the front kinematic unit, causing the rear kinematic unit to stay in place and allowing the front kinematic unit to be moved in the direction of the stationary rear kinematic unit. The two kinematic units are driven via a shared drive cable driven by a drive motor. The coupling rod for operating the rear kinematic unit requires structural space within the guide rail, which, in turn, requires a certain minimum height of the guide rail. This may be at the expense of vehicle passengers' headroom. Moreover, malfunctions and disruptive noises may occur when the coupling rod is being decoupled from the front kinematic unit and when the coupling rod is being coupled to the front kinematic unit.

The object of the invention is to provide a vehicle roof of the kind described above which allows a small structural height of the guide rails and ensures high operational reliability.

According to the invention, this object is attained by the vehicle roof having the features of claim 1.

SUMMARY

So the vehicle roof according to the invention comprises two drive cables for each of the bilaterally disposed displacement kinematics, the two drive cables being guided in two cable duct sections of the assigned guide rail, and two drive motors for the two kinematic units. The respective first drive cable, which is driven by the first drive motor, serves to operate or move the front kinematic unit in the guide rail. The second drive cable, which is driven by the second drive motor, serves to operate the assigned rear kinematic unit. So, compared to the state of the art described above, there is no coupling of the two kinematic units via a coupling rod or the like. Instead, all that is required is for the two drive motors to be operated in a harmonized manner, which is achieved by means of a suitable control unit. Thus, high operational reliability is ensured. Disruptive noises such as those resulting from the coupling and decoupling of the previously used coupling rod can no longer occur. The two cable duct sections for the two drive cables can be integrated in the guide rail without much structural space being required, which constitutes a great advantage in terms of structural space in the vertical roof direction and/or in the transverse roof direction compared to the vehicle roof having the coupling rod for the two kinematic units. The headroom for the vehicle passengers can thus be increased.

In the absence of the coupling rod, the kinematic units can be designed with less complexity. Additionally, the guide rails can be narrower, which, in turn, benefits the see-through roof portion provided by the vehicle roof.

The two guide rails of the vehicle roof according to the invention advantageously each comprise a guide track for the two kinematic units. In a preferred embodiment of the vehicle roof according to the invention, the two cable duct sections which are formed in each of the guide rails are in particular disposed on above the other on one side of the guide track. They can run the entire length of the guide rail. Alternatively, the cable duct sections can be disposed side by side.

In an alternative embodiment of the vehicle roof according to the invention, one of the two cable duct sections is disposed on one side of the guide track and the other cable duct section is disposed on the other side of the guide track. The cable duct sections can run the entire length of the guide rail in this case, as well.

In a specific embodiment of the vehicle roof according to the invention, in which one of the drive motors for the drive cables is disposed at the front relative to the orientation of the roof and the other drive motor is disposed at the rear or to the rear of the roof opening relative to the orientation of the roof, the two cable duct sections are disposed one behind the other in the longitudinal direction of the guide rail. In a guide rail realized in particular as an extruded profile, the two cable duct sections can also be flush which each other or transition into each other and have the same cross section; i.e., the two cable duct sections can be formed by the same profile duct.

When the roof opening system of the vehicle roof according to the invention is realized as a spoiler roof, the two rear kinematic units advantageously each comprise a tilting lever interacting with a guide track or a slotted track disposed on a support of the lid element.

It may be necessary for the front edge of the lid element to be shifted first in order to allow the rear edge of the lid element to be tilted. To this end, the front kinematic units can each comprise a tilting lever hinged to a support of the lid element.

Other advantages and advantageous configurations of the subject matter of the invention are apparent from the description, the drawing and the claims.

BRIEF DESCRIPTIONS OF THE DRAWINGS

Two examples of configurations of a vehicle roof according to the invention are illustrated in a schematically simplified manner in the drawing and will be explained in more detail in the following description.

DETAILED DESCRIPTION

Figure 1:
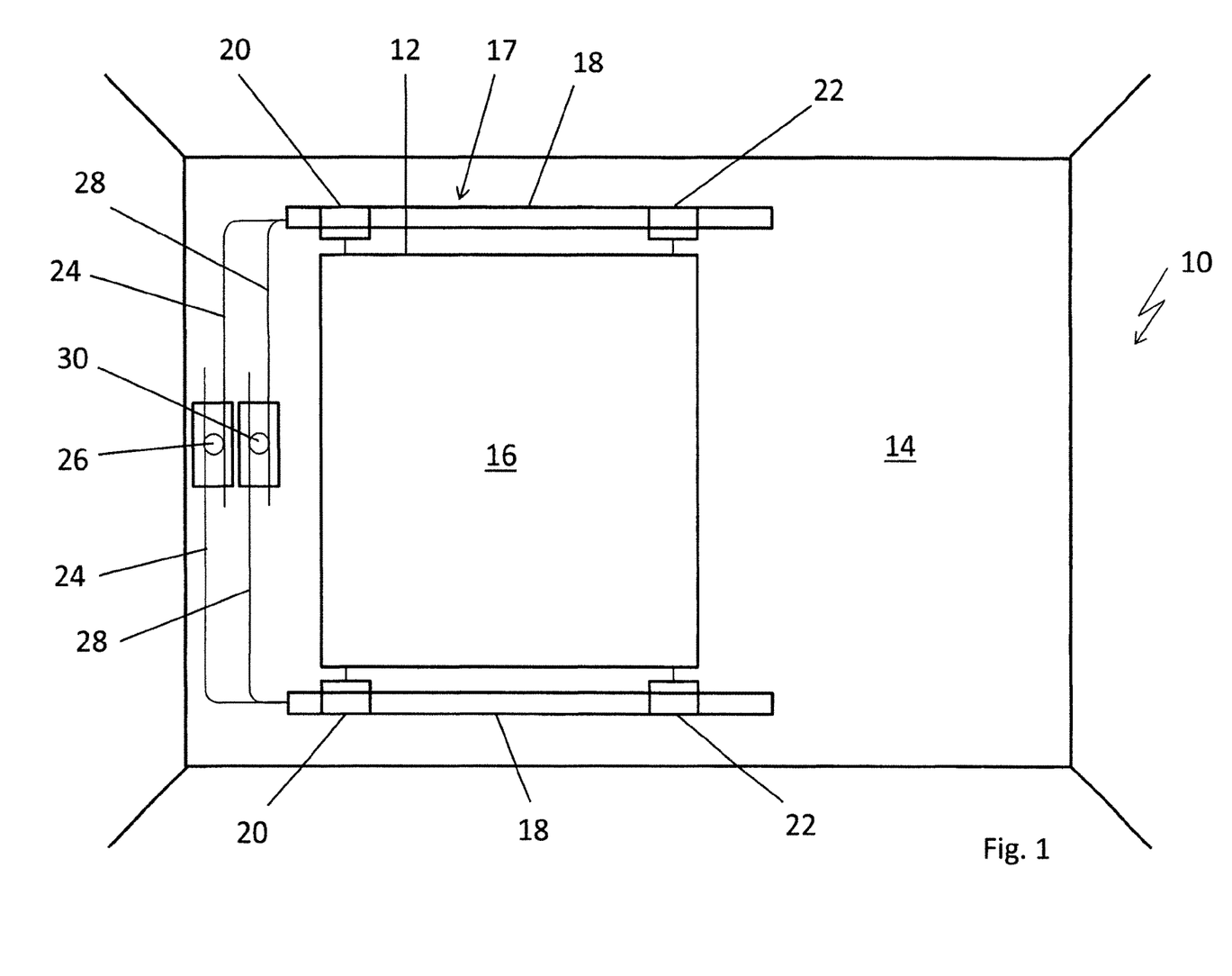
FIG. 1 is a schematic top view of a vehicle roof according to the invention.

In a highly schematic fashion, FIG. 1 shows a vehicle roof 10 which is an openable vehicle roof of a passenger car and which has a roof opening 12 limited by a solid roof portion 14 and capable of being selectively closed or at least partially opened by means of a lid element 16 which is part of a roof opening system 17 forming a spoiler roof.

Roof opening system 17 of vehicle roof 10 has a guide rail 18 on either side of a vertical longitudinal center roof plane. Each guide rail 18 accommodates a front kinematic unit 20 and a rear kinematic unit 22. Front kinematic units 20 are driven by a first drive motor 26 via first drive cables 24. Rear kinematic units 22 are driven by a second drive motor 30 via second drive cables 28. Drive motors 26 and 30 are each disposed centrally on a front frame part forward of roof opening 12.

Roof opening system 17 is illustrated in detail in FIGS. 2 to 11 and described below.

For the sake of clarity, roof opening system 17 will be described only with reference to the kinematic area disposed on the left relative to the forward direction of travel of the vehicle in question. The kinematic area disposed on the right relative to the forward direction of travel is essentially symmetrical and is therefore apparent by analogy.

Figure 11:
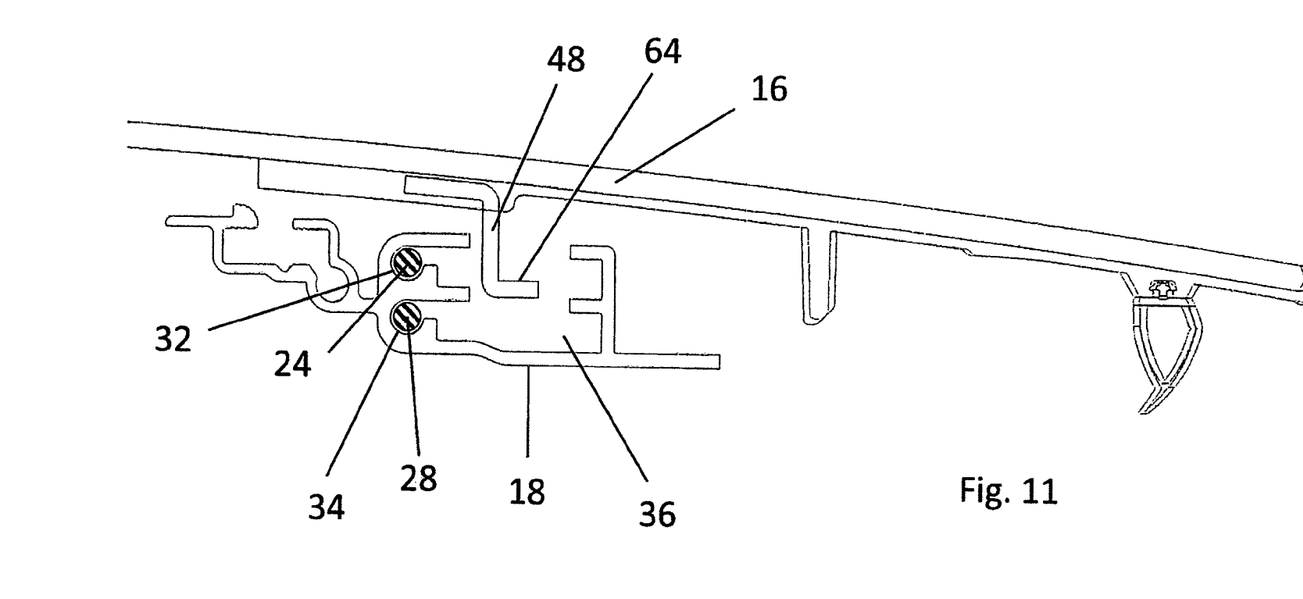
FIG. 11 is a section through a guide rail of the roof opening system.

As described above, roof opening system 17 comprises displacement kinematics having a guide rail 18 on both sides, a front kinematic unit 20 and a rear kinematic unit 22 being disposed in guide rail 18. Kinematic units 20 and 22 are connected to separate drive cables 24 and 28, respectively. As shown in FIG. 11 in particular, drive cables 24 and 28 are guided in cable duct sections 32 and 34, respectively, in guide rail 18. Cable duct sections 32 and 34, which each run the entire length of guide rail 18, are disposed one above the other and on one side of a guide track 36 of guide rail 18. Kinematic units 20 and 22 are guided and disposed, respectively, in guide track 36.

Figure 6:
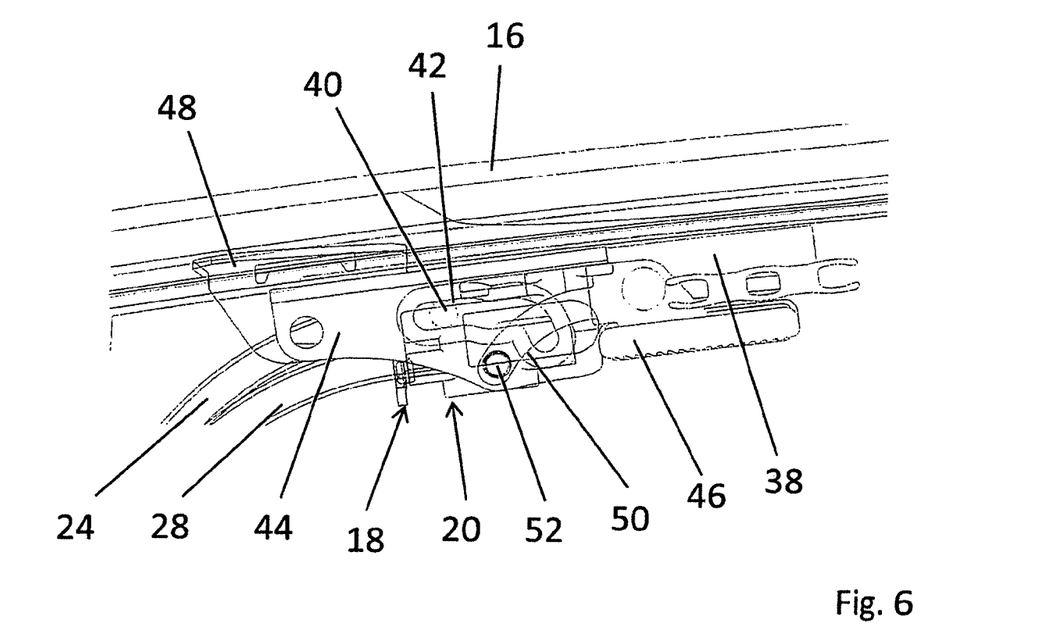
FIG. 6 is an enlarged view of a front kinematic unit of the roof opening system for the closed position of the lid element.
Figure 7:
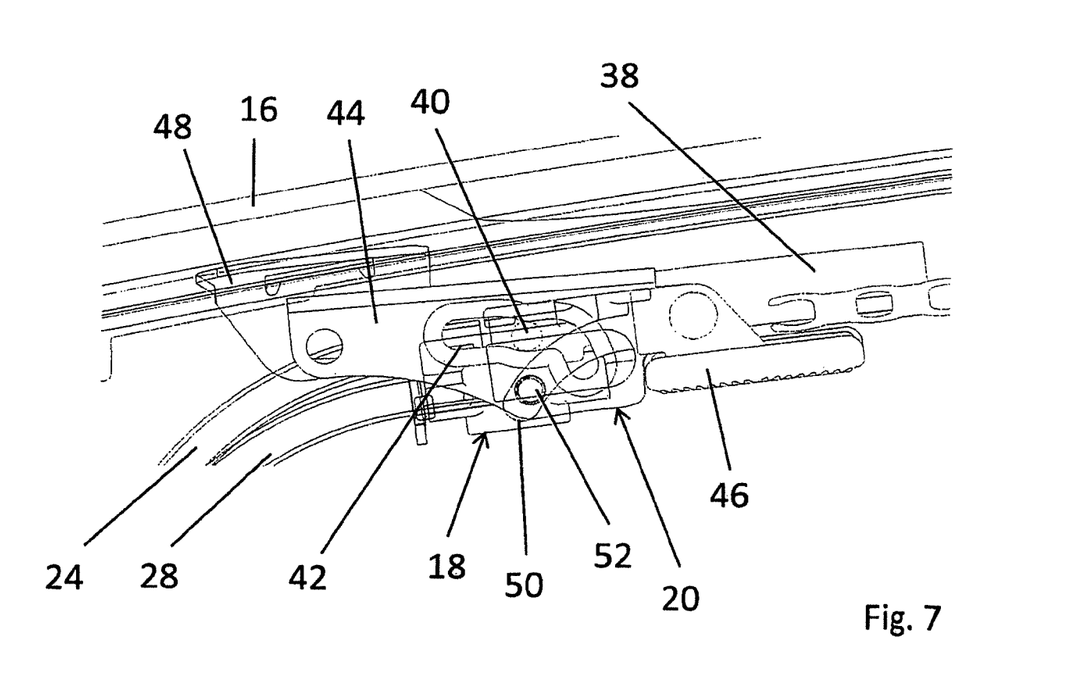
FIG. 7 is a view of the front kinematic unit corresponding to FIG. 6, but for the ventilation position of the lid element.
Figure 8:
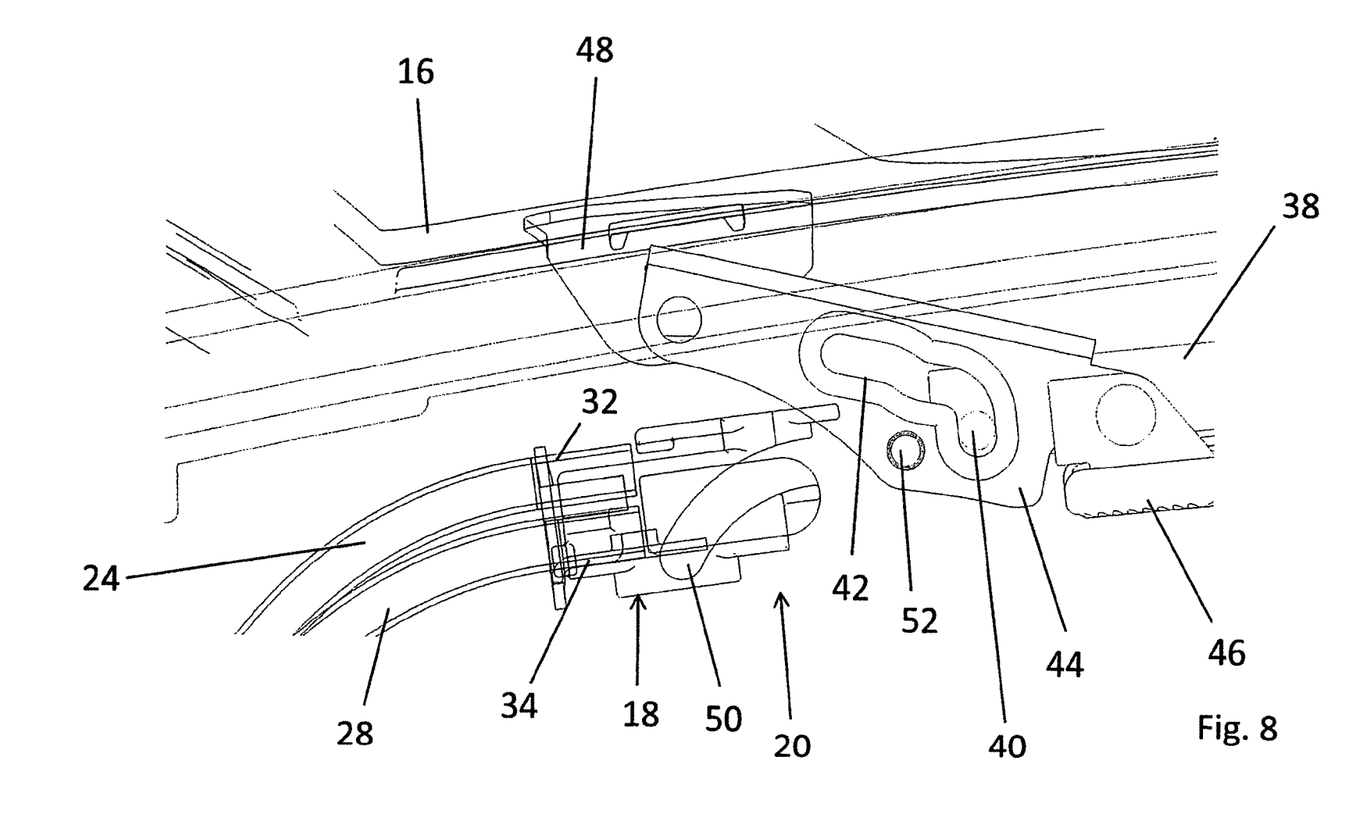
FIG. 8 is also a view of the front kinematic unit corresponding to FIG. 6, but for the moved state of the lid element.

Front kinematic unit 20 comprises a drive slide 38 which is connected to first drive cable 24 and on which a pin 40 is formed which is guided in a tilting slot 42 formed on a tilting lever 44 hinged to a slide 46 at one end and to a support 48 at the other end, support 48 being disposed on the underside of lid element 16. Moreover, a slot 50 is assigned to front kinematic unit 20, slot 50 being formed at the front end of guide rail 18 and interacting with a pin 52 formed on tilting lever 44.

Figure 9:
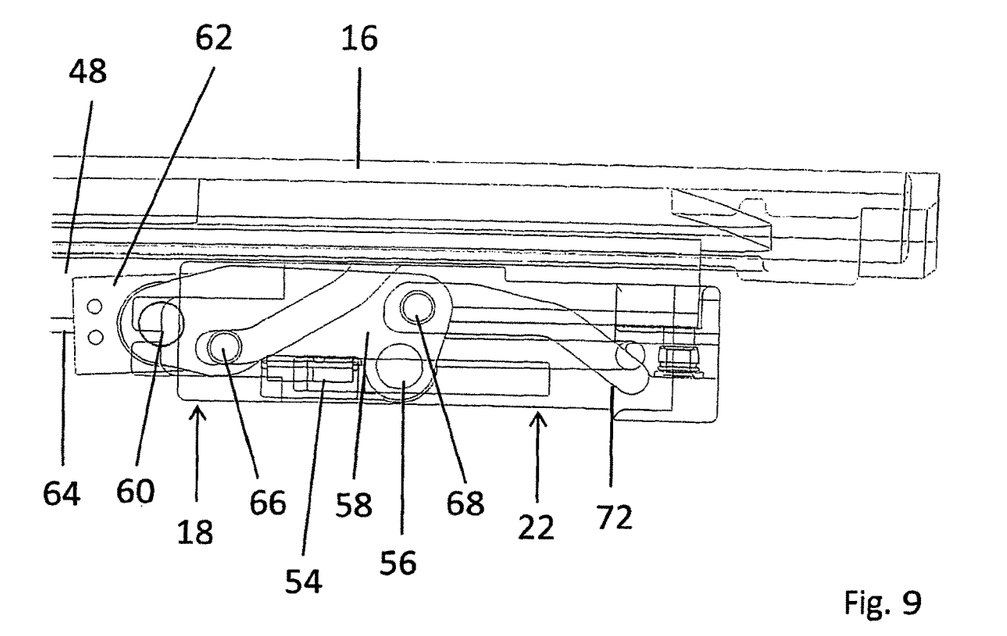
FIG. 9 shows a rear kinematic unit of the roof opening system for the closed position of the lid element.
Figure 10:
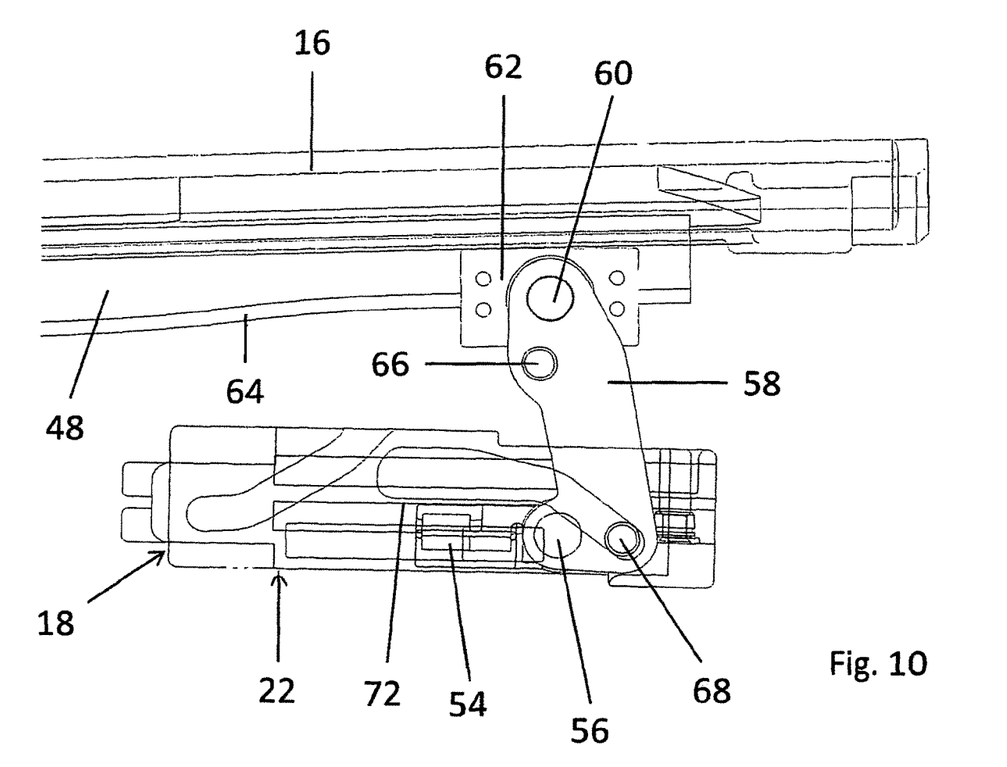
FIG. 10 is a view of the rear kinematic unit corresponding to FIG. 9, but for the ventilation position of the lid element.

Rear kinematic unit 22 comprises a drive slide 54 which is connected to second drive cable 28 and to which a tilting lever 58 is connected via a joint 56, tilting lever 58 being connected to a slider 62 via a joint 60, slider 62 being guided on a guide track or a slot track 64 formed on support 48 of lid element 16. Two control pins 66 and 68 are formed on tilting lever 58. Control pin 66 interacts with a slot 70 formed on guide rail 18. Control pin 68 interacts with another slot 72 also formed on guide rail 18.

Figure 2:
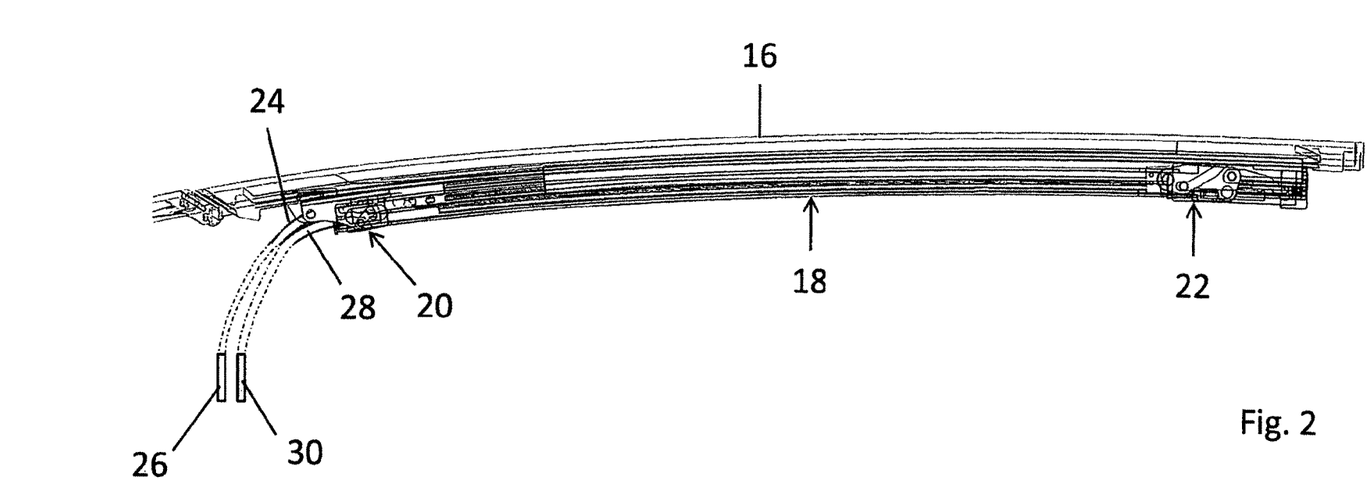
FIG. 2 is a schematic side view of a roof opening system of the vehicle roof of FIG. 1 with a lid element in a closed position.
Figure 3:
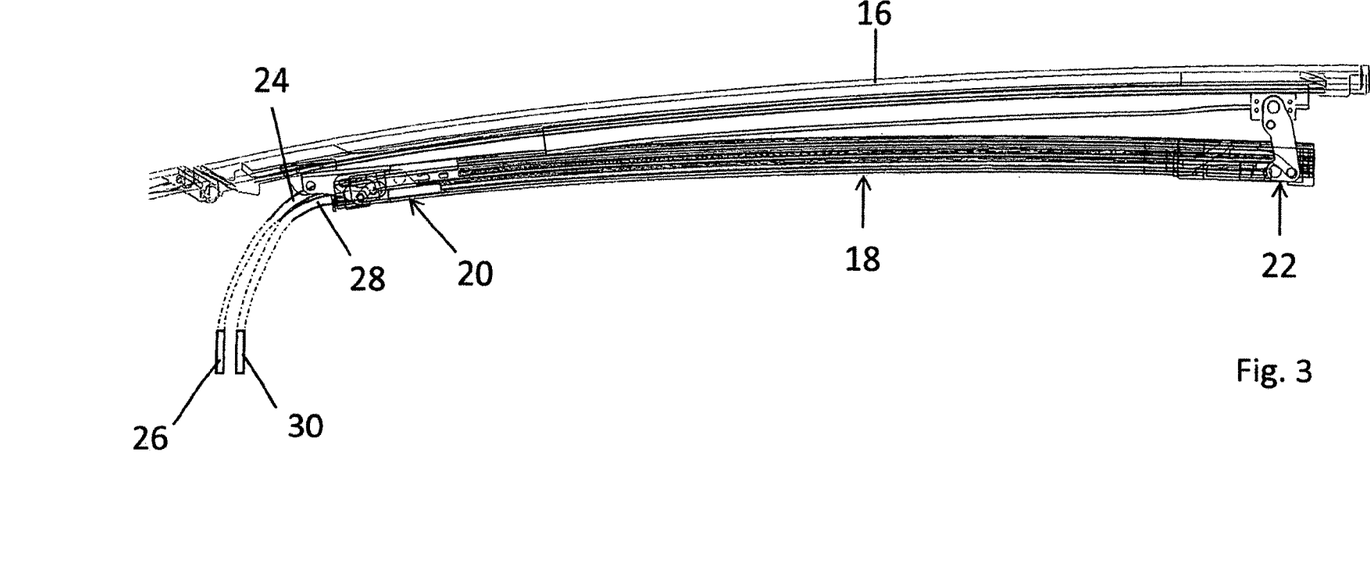
FIG. 3 is a view of the roof opening system corresponding to FIG. 2, but with the lid element in a ventilation position.
Figure 4:
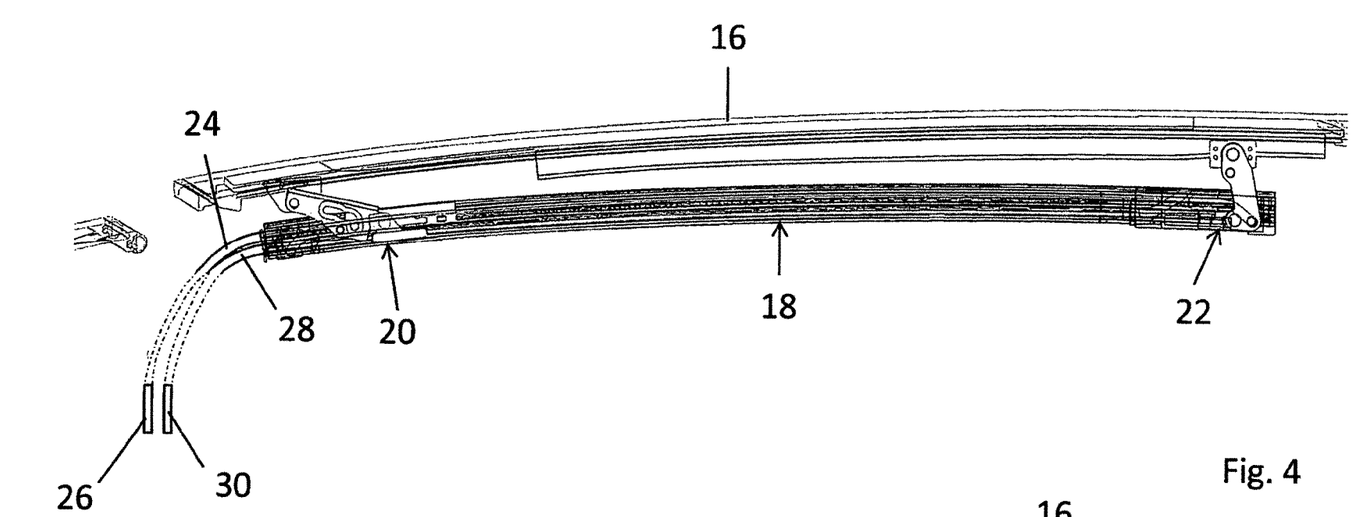
FIG. 4 is also a view of the roof opening system corresponding to FIG. 2, but with the lid element moved slightly rearward.
Figure 5:
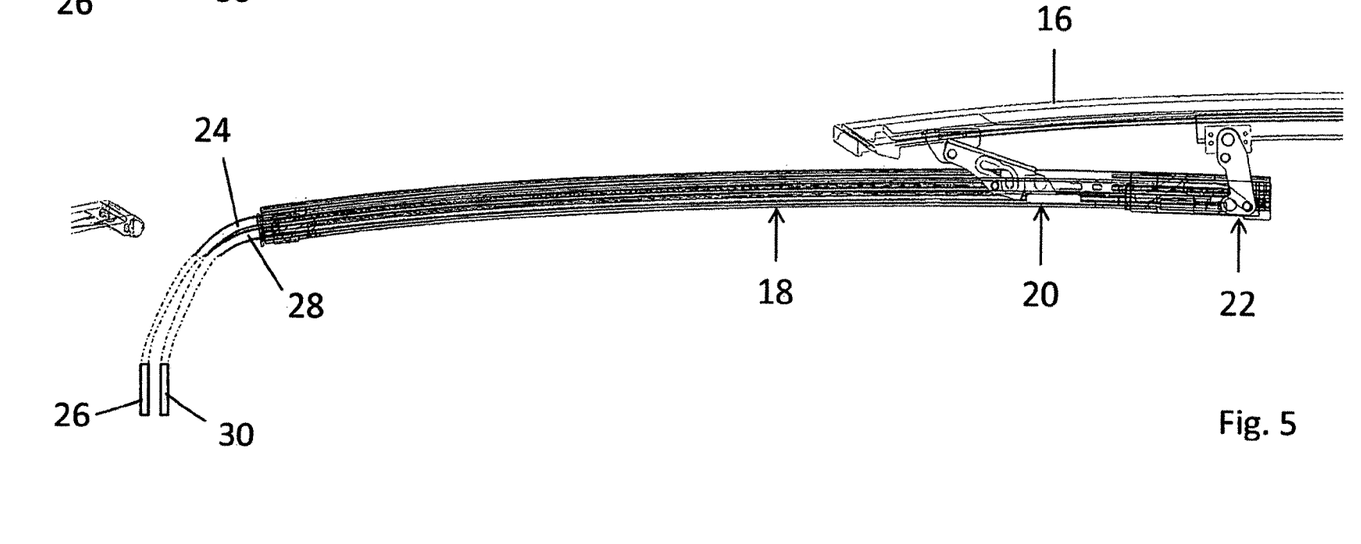
FIG. 5 is also a view of the roof opening system corresponding to FIG. 2, but with the lid element in an open position.

In order to shift lid element 16 from the closed position illustrated in FIG. 2 into the open position illustrated in FIG. 5, both drive motors 26 and 30 are operated first, whereby drive slide 38 is moved relative to slide 46 by means of first drive cable 24, as illustrated in FIGS. 6 to 8, causing the front edge of lid element 16 to be slightly lifted by the interaction of pin 40 with slot 42 of tilting lever 44. Additionally, drive slide 54 is moved in the direction of the rear by means of second drive cable 28, whereby tilting lever 58 is tilted and thus the rear edge of lid element 16 is lifted by the interaction of control pins 66 and 68 with slots 70 and 72. Second drive motor 30 can then be stopped, whereas first drive motor 26 drives drive slide 38 in such a manner that lid element 16 is moved in the direction of the rear by the coupling of pin 40 with tilting lever 44. Guide track 64 of support 48 slides on slider 62 in the process, causing lid element 16 to be shifted to above solid roof portion 14.

Lid element 16 is moved from the open position into the closed position in the analog opposite manner.

Figure 12:
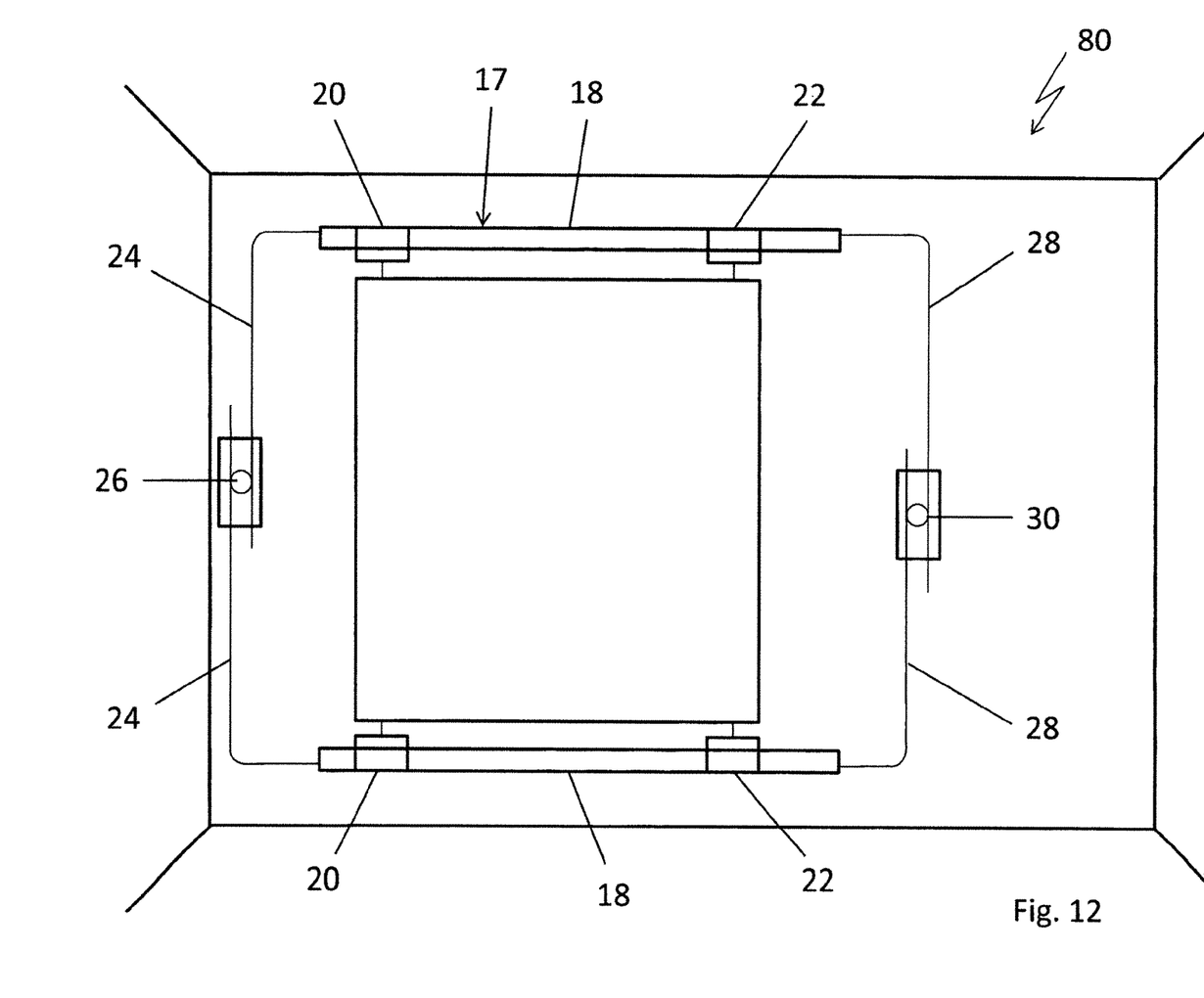
FIG. 12 is a schematic top view of an alternative embodiment of a vehicle roof according to the invention.
Figure 13:
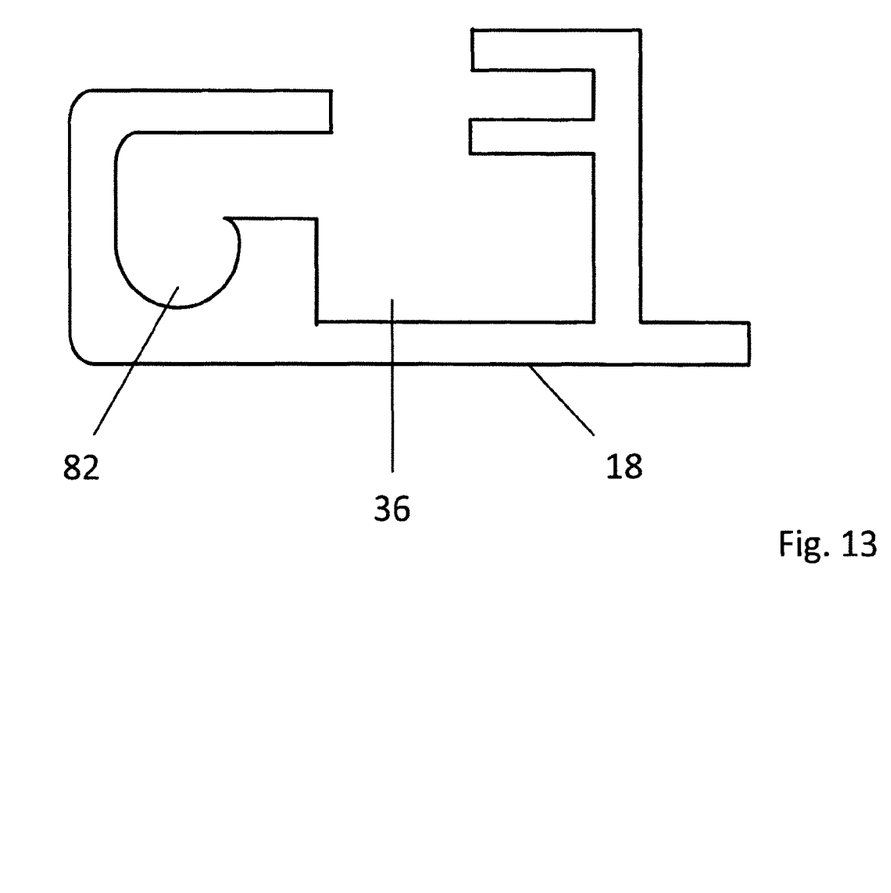
FIG. 13 is a section through a guide rail of a roof opening system of the vehicle roof of FIG. 12.

FIGS. 12 and 13 show a vehicle roof 80, which largely corresponds to that of FIGS. 1 to 11 but differs from it in that it comprises a first drive motor 26 for front kinematic units 20 which is disposed forward of roof opening 12, and a second drive motor 30 for rear kinematic units 22 which is disposed to the rear of or behind roof opening 12. Drive cables 28 for rear kinematic units 22 are guided into guide rails 18 from the rear. Drive cables 24 for front kinematic units 20 are guided into guide rails 18 from the front. A duct 82 for each of drive cables 24 and 28 is formed in each guide rail 18, duct 82 forming a cable duct section for respective drive cable 28 in the rear end portion of respective guide rail 18 and a cable duct section for front drive cable 24 of front kinematic unit 20 in the rest of guide rail 18. So the cable duct sections for drive cables 24 and 28 are formed by shared duct 82 of guide rail 18. Duct 82 is disposed on the inner side of guide track 36 for kinematic units 20 and 22 relative to the vertical longitudinal center roof plane.

Otherwise, vehicle roof 80 corresponds to that of FIGS. 1 to 11.

The invention claimed is:

1. A vehicle roof having a roof opening system, the vehicle roof comprising:
    a lid element displaceable between a closed position, in which a roof opening is closed, and an open position, in which the roof opening is open,
    displacement kinematics for displacing the lid element which are disposed on either side of a vertical longitudinal roof plane,
    each of the displacement kinematics comprising a guide rail, a front kinematic unit guided in the guide rail and a rear kinematic unit disposed in the guide rail, and a set of drive cables for the two kinematic units,
    wherein the guide rail comprises a first cable duct section for a first drive cable of the set of drive cables, the first drive cable being driven by a first drive motor and driving the front kinematic unit, and a second cable duct section for a second drive cable of the set of drive cables, the second drive cable being driven by a second drive motor and driving the rear kinematic unit,
    wherein the guide rail comprises at least one guide track for the two kinematic units, and the two cable duct sections are disposed on one side of the guide track, one above the other, and
    wherein the front kinematic unit comprises a tilting lever hinged to a support of the lid element and to a slide, wherein the tilt lever comprises a tilting slot.

2. A vehicle roof having a roof opening system, the vehicle roof comprising:
    a lid element displaceable between a closed position, in which a roof opening is closed, and an open position, in which the roof opening is open,
    displacement kinematics for displacing the lid element which are disposed on either side of a vertical longitudinal roof plane,
    each of the displacement kinematics comprising a guide rail, a front kinematic unit guided in the guide rail and a rear kinematic unit disposed in the guide rail, and a set of drive cables for the two kinematic units,
    wherein the guide rail comprises a first cable duct section for a first drive cable of the set of drive cables, the first drive cable being driven by a first drive motor and driving the front kinematic unit, and a second cable duct section for a second drive cable of the set of drive cables, the second drive cable being driven by a second drive motor and driving the rear kinematic unit;
    wherein the guide rail comprises at least one guide track for the two kinematic units, and the two cable duct sections are disposed on one side of the guide track, one above the other,
    wherein the front kinematic unit comprises a tilting lever hinged to a support of the lid element and to a slide, wherein the tilt lever comprises a tilting slot; and
    wherein the two cable duct sections are disposed one behind the other in the longitudinal direction of the guide rail.

3. The vehicle roof according to claim 1, wherein the rear kinematic unit comprises a tilting lever interacting with a guide track disposed on a support of the lid element.

* * * * *